Sept. 4, 1934.  K. WERNHARDT  1,972,119
DOWEL PIN FOR CONNECTING PARTS OF MACHINERY, APPARATUS, AND THE LIKE
Filed Dec. 30, 1931
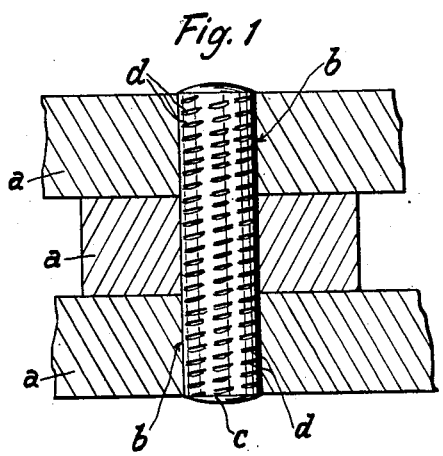
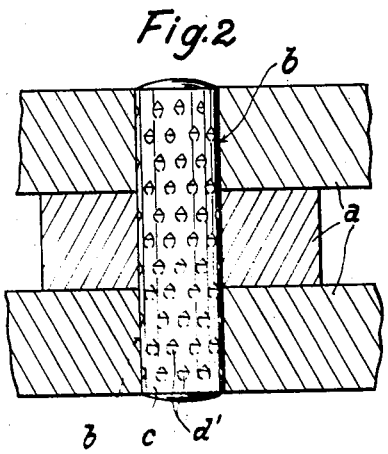
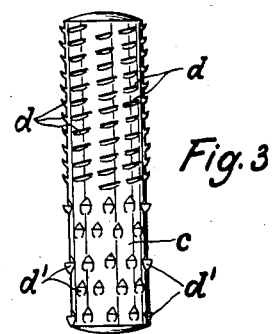
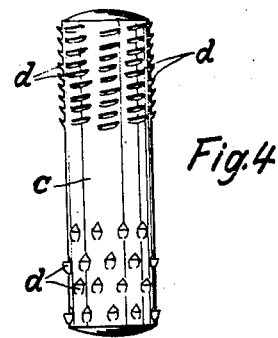
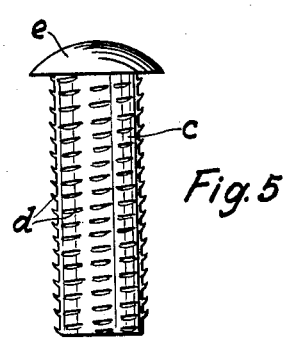
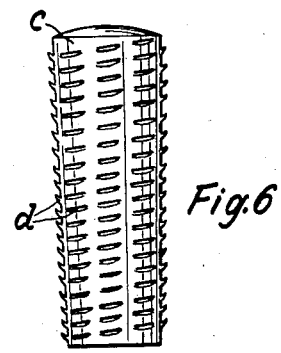
Inventor:

Patented Sept. 4, 1934

1,972,119

UNITED STATES PATENT OFFICE 1,972,119

DOWEL PIN FOR CONNECTING PARTS OF MACHINERY, APPARATUS, AND THE LIKE

Kurt Wernhardt, Berlin, Germany

Application December 30, 1931, Serial No. 583,970
In Germany July 9, 1930

1 Claim. (Cl. 85—21)

This invention relates to metal pins of the kind used for connecting holed metal parts, and consists in providing the pin with projections dug out from the body of the pin like the teeth of a rasp and adapted to yield in order to ensure a snug fit in holes of larger diameter than the body of the pin itself.

It should be noted that it has previously been proposed to provide pins of this kind with helical or circumferential grooves, and also that it is known to provide nails and pins, intended for insertion into material softer than the nails or pins themselves, with projections serving as barbs adapted to resist the extraction of the elements. In using barb-like projections on metal pins for connecting holes metal parts according to the present invention the advantage is obtained that the pins will be elastic and fit snugly whether the holes are true or not.

In the accompanying drawing Figs. 1 to 6 show several embodiments of the present invention, Figs. 1 and 2 being each a longitudinal section of several plates assembled by means of the novel pin and representing the simplest form of application thereof.

In the embodiment shown by Fig. 1 $a$ are three plates having a common bore $b$ and being connected to one another by the novel pin $c$ driven into the bore $b$. In the embodiment shown the dowel pin $c$ is cylindrical and on its circumferential surface provided with projections $d$ dug out from the body of the pin like the teeth of a rasp. On account of these projections the circumference or diameter of the pin $c$ has been artificially enlarged at various points by the metal displaced so that, when the pin is being driven into the common bore $b$ of the structural members $a$ to be assembled, the diameter of which bore approximately corresponds to the original diameter of the said pin and is not smaller, the latter with its projecting metal exerts a pressure on the wall of the bore while the projections are partially pressed back into the initial cylindrical circumferential surface. This results in an excellent fit of the pin in the bore and in a clatter-proof connection of the structural members $a$ with one another and at the same time in the pin being efficaciously secured against axial displacement.

While the pin shown in Fig. 1 is provided with projections $d$ which as a whole produce a roughening of the circumferential surface of the pin $c$ resembling a sort of fine rasp cut, which need not be of regular shape, the embodiment illustrated by Fig. 2 shows a coarse rasp-like notching $d'$ on the cylindric surface of the pin. In either case the directions of the rows of projections $d$ and $d'$ respectively are slightly oblique in respect to the longitudinal axis of the pin $c$ in order that, as the pin is being driven into the bore $b$, the metallic projections will be more or less pushed back into the notches so that the bearing pressure required is exerted by the circumferential surface of the pin on the internal wall of the bore $b$.

As Fig. 3 shows both types of notching $d$ and $d'$ may be applied to a dowel pin. In Fig. 4, which shows a similar arrangement the centre portion of the pin $c$ has been kept free from projections so that this portion can fit loosely, for instance within a revoluble member. Accordingly surfaces of the pin which are not required to produce a tight fit, for instance the top and bottom ends or the middle portion of the said pin may be left free from projections.

Fig. 5 shows the last embodiment of the series comprising cylindric pins, viz. a pin $c$ provided with a head like a rivet. This head $e$ may naturally have any other suitable shape.

Fig. 6 finally represents an embodiment of the invention in which the toothed pin $c$ is tapered or conical.

These pins may be toothed in such a way that the tooth rows run across or longitudinally, parallel or oblique in respect to the longitudinal axis of the pin. Further the said rows may cross each other as in the case of a file. Finally the projections may be larger at one end or at both ends or in the middle of the pin as compared with the other portions thereof so that the diameter of the pin of these particular portions is enlarged.

I claim:

A pin for connecting metal parts provided with registering holes and consisting of a cylindrical body having a plurality of series of spurs projecting therefrom and all facing in like direction toward one end of the body, said series of spurs being arranged in circumferentially spaced rows extending longitudinally of the body, the spurs in said rows being circumferentially elongated and inclined to substantially form interrupted helical threads, said helically arranged spurs being located at one end of the body and facing towards said end, and other spurs facing in like direction at the remaining end of the body, the last mentioned spurs being arranged in rows extending annularly around the body and consisting of short projections.

KURT WERNHARDT.